(12) United States Patent
Bestelmeyer (10) Patent No.: US 7,198,007 B2
(45) Date of Patent: Apr. 3, 2007

(54) METHOD AND DEVICE FOR CLEANING AND CARING FOR DOGS, PARTICULARLY DOG PAWS

(76) Inventor: Margot Bestelmeyer, Godostrasse 5, 82131 Gauting (DE)

( * ) Notice: Subject to any disclaimer, the term of this patent is extended or adjusted under 35 U.S.C. 154(b) by 0 days.

(21) Appl. No.: 10/511,443

(22) PCT Filed: Apr. 30, 2003

(86) PCT No.: PCT/DE03/01385

§ 371 (c)(1),
(2), (4) Date: Oct. 26, 2004

(87) PCT Pub. No.: WO03/092366

PCT Pub. Date: Nov. 13, 2003

(65) Prior Publication Data

US 2005/0224013 A1    Oct. 13, 2005

(30) Foreign Application Priority Data

Apr. 30, 2002  (DE) ................................ 102 19 399
Mar. 24, 2003  (DE) ................................ 103 12 975

(51) Int. Cl.
*A01K 29/00* (2006.01)
(52) U.S. Cl. ..................................................... 119/673
(58) Field of Classification Search ................ 119/673, 119/674, 675, 676; 15/302; D24/204; 4/541.5, 4/574.1
See application file for complete search history.

(56) References Cited

U.S. PATENT DOCUMENTS

| | | | | | |
|---|---|---|---|---|---|
| 2,719,307 | A | * | 10/1955 | Reid | 119/673 |
| 4,316,433 | A | * | 2/1982 | Hebert | 119/673 |
| 4,317,431 | A | * | 3/1982 | Sparkes | 199/673 |
| 4,520,525 | A | * | 6/1985 | Yogi et al. | 4/574.1 |
| 4,569,337 | A | * | 2/1986 | Baumann et al. | 4/574.1 |
| 5,794,570 | A | * | 8/1998 | Foster et al. | 119/673 |
| 6,237,537 | B1 | * | 5/2001 | Winchester | 119/673 |
| 6,739,286 | B2 | * | 5/2004 | Vander Veen | 119/673 |
| 2002/0112670 | A1 | | 8/2002 | Wheelwright | |

FOREIGN PATENT DOCUMENTS

CA    1192105    8/1985

* cited by examiner

*Primary Examiner*—Thomas Price
(74) *Attorney, Agent, or Firm*—Dennison, Schultz & MacDonald (57) ABSTRACT

In order to clean dog paws, the dog is placed on a perforated intermediate bottom located inside a tub-like basin, and the basin is filled with water to a level higher than the intermediate bottom until the paws are submerged. Air is injected, preferably in a lateral and/or downward manner, out of a first branch of an air supply system into the water by a blower, said branch being located underneath the intermediate bottom. The air is distributed in the water and the pressure thereof is sufficient for removing dirt adhering to the paws by bubbling and without spraying. After a cleaning phase, the pressure of the compressed air is maintained in the first branch, as long as it is immersed in the water, at a level sufficient for preventing dirt from entering the air outflow openings. During a drying phase, a second branch of the air supply system is supplied with air, said second branch being provided with at least one outlet opening for drying air.

11 Claims, 8 Drawing Sheets

_Fig. 8_

_Fig. 9_

METHOD AND DEVICE FOR CLEANING AND CARING FOR DOGS, PARTICULARLY DOG PAWS

This application is a filing under 35 USC 371 of PCT/DE2003/01385. filed Apr. 30, 2003.

The invention relates to a method for cleaning and caring for dogs, particularly dog paws in a tub-like basin which accommodates the dog and has a perforated intermediate bottom as a standing area for the dog, and a device for using this method.

Every dog needs daily exercise. When the dog owner returns from a walk with his dog, the dog's paws must be cleaned from adhering dirt before entering the house. This cleaning is also recommended by veterinary surgeons because the paws can be attacked by the residue of de-icing salt. Cleaning the paws is cumbersome and tedious so that it has already been proposed that a cleaning device should be used for this purpose. A device is known from DE 298 07 717 U1 in which an intermediate bottom provided with slits is located in a tub-like container, through which slits brushes which dip into a water bath and are mounted rotatably about horizontal axes underneath the intermediate bottom, grip upwards.

This device has the disadvantage that the rotating brushes are perceived as unpleasant by the dog and that he thus strives to leave the device as soon as the brushes start to rotate. In addition, the dog leaves the device with wet paws which is undesirable.

Animal washing cabins with a drying device are certainly already available but these devices are not suitable for cleaning paws, on the one hand, because they do not have special facilities for cleaning paws and, on the other hand, because the entire animal is treated with water and the drying process, e.g. for dogs with long-haired fur, takes some considerable time. For a relatively fast paw cleaning on returning every time after leaving the house, the expenditure is much too great, in addition such a frequent full bath is in no way helpful to the health of the dog although, on the other hand, completely washing the dog is quite sensible at reasonable intervals. In particular, in veterinary medicine a complete bath of the dog is frequently required to apply care products or medicinal products added to the bath through the fur onto the surface of the skin for which purpose however a tiring massage is additionally to be used so that these products penetrate through the fur and actually reach as far as the skin and as far as possible reach all areas of the skin, which is in no way guaranteed however, even with a thorough massage.

Since the dog has the habit of speeding up the drying process by vigorously shaking its thoroughly soaked fur, a bathing device takes up substantially more space than a device which is merely restricted to paw cleaning because of the required protection against spray. Thus, a suitable place for this can usually be found even when space is limited and preferably near the entrance door.

In the case of large, heavy dogs it is difficult and tiring to lift the dog into the basin, especially if the basin is to be suitable for a full bath and the basin edge is relatively high. In addition, dogs are usually frightened when they are suddenly placed with their entire body in water. Thus, bathing devices with a door in the side wall and basins in which, after inserting the dog, water is gradually admitted until the required level is reached have already been proposed. This has the disadvantages that it takes several minutes until the basin is filled and that the water must always be drained completely after each bath and in addition, a closable opening in the side wall of the basin represents an additional design expenditure which can also prove a hindrance if special cleaning or drying devices are to be installed in the basin.

Thus, there are different requirements according to whether only the paws of a dog are to be cleaned or whether the dog is to have a complete bath.

For the dog owner the most urgent problem is to clean the dog's paws, possibly several times a day, when it comes back into the house of the dog owner.

It is thus the object of the invention to develop a cleaning method which is not perceived by the dog to be unpleasant, which can be executed largely automatically with little expenditure of time and which nevertheless has a thorough effect, and a device suitable for executing this method which are primarily limitable to the fast and effective cleaning and drying of paws, wherein however they should also be configurable for an improved administration of complete baths, if necessary also for veterinary medical treatment. In this case in particular, the device intended for cleaning paws should not make any particular requirements regarding the site or operation, it should be relatively inexpensive to manufacture and operate, wherein if necessary a gradual expansion to enhance operating comfort should also be made possible.

According to the invention, a method for caring for, especially cleaning of dogs in a tub-like basin which accommodates the dog and has a perforated intermediate bottom as a standing area for the dog is configured such that the basin is filled to such a level with water that the paws of a dog placed on the intermediate bottom are located in the water during the cleaning, that an air supply system is acted upon with compressed air by a blower and air is blown into the water and distributed from a first branch of the air supply system arranged underneath the intermediate bottom through first air outflow openings, the pressure of said air being sufficient to remove dirt adhering to the paws by bubbling and without spraying, that after the cleaning phase the air pressure in the first branch, as long as it is immersed in the water, is maintained at least at a level which is sufficient for preventing dirt from penetrating into the air outflow openings, and that during a drying phase a second branch of the air supply system provided with at least one outlet opening for drying air is supplied with air.

Tests have shown that such a bubbling bath is accepted by the dog without a defensive reaction and that the cleaning phase normally takes a minute at the most and the cleaning effect is completely satisfactory without special supporting measures.

Bubbling baths have long been recommended for care of the human body on account of their physiological effect.

Especially known are mat-like inlays for bath tubs which can be connected to an air supply and produce a bubbling effect via fine outflow openings. However, these bubbling mats are quite expressly not provided for cleaning baths but rather it is expressly demanded that before a bubbling bath, a thorough cleaning bath is necessary in which the bubbling mat is not located in the tub. After the cleaning bath, the body should be carefully dried, the tub should be thoroughly cleaned and only then may the bubbling mat be inserted in the tub and this then refilled with water.

After the bubbling bath, the bubbling mat should be carefully cleaned.

If all these requirements are summarised, the bubbling bath is thus a time-consuming process with a high water consumption. If one wished to apply such a procedure to a method for cleaning dog paws every time the dog returns from a stay outside the house, it is likely that hardly any dog lover would accept the expenditure associated therewith, rather the cleaning of the dog paws must be accomplished in about 2 to 3 minutes without major expenditure.

The reason for the cumbersome procedure required when using bubbling mats can be seen in the fact that dirt particles in the bath water can penetrate into the fine air outlet openings and can block the airway. It was thus regarded as impossible to use a bubbling bath as a cleaning bath at the same time. The invention makes use of the fact that the air flowing out through the air outlet openings prevents dirt from penetrating into the opening cross-section, which is why this air flow must be maintained for at least as long as the openings are located in the water. Preferably however, the air pressure in the first branch is maintained for an after-run time sufficient for drying the opening area after the wetting of the first branch by the water has ended.

Since a blower is present for the bubbling bath, drying of the dog's paws or other parts of the body still moist after the cleaning process can be accomplished by drying air from the second branch of the air supply system in a particularly simple and suitable fashion. The division of the air supply system into two branches makes it possible to control the bubbling bath and the drying separately. If the expenditure on apparatus is to be kept low, it is sufficient that the air emerges from the second branch via an air hose which can be guided by hand. In this situation, the dog can also be dried with the air flow emerging from the air hose outside the tub-like basin. According to an advantageous embodiment however, during the drying phase the intermediate bottom with the dog can be raised above the surface of the water, which at the same time makes it possible to leave barely contaminated water in the basin without any additional space requirement and re-use it for the next paw cleaning. This is possible because the part of the first branch of the air supply system having the air outlet openings for the bubbling bath is raised from the water together with the intermediate bottom and remains there until the next cleaning process so that the blow-out openings are not exposed to any risk of clogging.

After the cleaning phase however, the basin can also be emptied and then during the drying phase the dog can be dried inside the basin using the air flow emerging from the air hose. Since the entire procedure comprising cleaning and drying should take place quickly and effortlessly, in this case the emptying of the basin should also proceed as quickly as possible, which on the one hand can be accomplished by a feed pump preferably provided with a dirt filter which withdraws water from the basin whilst on the other hand, the outflow cross-section should be made suitably large.

An advantageous embodiment of the invention consists in the fact that during the cleaning phase water is withdrawn from the basin via a feed pump which can be switched on and off and preferably after passing through a dirt filter is supplied to a manually guidable water hose at sufficient pressure such that it emerges from this hose as a washing jet which can then be directed towards very dirty parts of the dog's body. In the rather rare cases where for example the dog's belly also requires cleaning, this can take place using the water hose. However, the feed pump can also be used for emptying the basin whereupon the dog can be dried in the basin. This can take place using the air hose. If the dog remains in the emptied basin for drying, more appropriately the air outflow from the first branch is also maintained during the drying phase so that the dog is dried by the ascending air flow, wherein the air flow directed towards the paws from below is especially useful.

Preferably during the cleaning phase the water is held continuously by a circulating pump in a circuit which passes via a dirt filter.

A very advantageous possibility then consists in the fact that during the drying phase a care agent for the paws is added in metered fashion to the air flowing via the first branch.

A further suitable embodiment consists in the fact that during the drying phase the air from the second branch is blown out through inwardly directed and downwardly sloping outlet openings arranged in the upper area of the side walls of the basin whereby the moisture is displaced downwards and the drying is supported so effectively that the additional use of the air hose may well be dispensed with.

It is especially advantageous if the air conveyed by the blower is heated. This is not only appropriate for the use of the blower air for drying but also for tempering the bubbling bath.

In order to reduce the water consumption when the basin is emptied before the drying phase, an especially advantageous embodiment of the method consists in the fact that the basin is emptied into a collecting container via a closable fast-emptying opening and the feed pump sucks water from the collecting container to fill the basin or for using the water hose. As a result, the emptying can take place faster than by the feed pump.

For executing the method according to the invention a device for cleaning dog paws with a tub-like basin having a base and a side wall extending upwards from this base and having a perforated intermediate bottom as a standing area for the dog to be cleaned inside the space enclosed by this basin at a vertical distance from the bottom of the basin is configured such that a first branch of an air supply system connected to a controllable blower is arranged underneath this intermediate bottom, which is provided with laterally and/or downwardly directed air outlet openings distributed over the base surface which are preferably directed such that they slope downwards towards both sides.

The dirt dissolved in the water, as far as this is separated from the water, tends to either collect on the surface of the water or sink to the bottom. Clogging of the air outlet openings of the bubbling system located in the water is prevented by the air outlet openings being directed laterally or downward so that deposits can in any case occur on the upper side of the air line at a distance from the openings. Since the air outflow through the openings is maintained according to the method for at least as long as water flows around the openings, the air outlet openings are thereby protected from clogging.

Since depending on the stature and posture of the dog, its paws can be located at very different points on the intermediate bottom, a bubbling effect distributed as uniformly as possible over the surface must be achieved which is why the air outlet openings are directed to both sides and possibly slope downwards, whereby the ascending air is distributed more uniformly in the water.

If the paws are only slightly dirty, the filling of the basin can be used for a plurality of cleaning processes. In order to prevent any clogging of the air outlet openings, the region of the first branch having these openings must not remain in the water after the cleaning phase. The diversion of the water into a collecting container is an advantageous solution of this problem. It is especially advantageous if the spatial conditions and also the size of the dog allow the collecting container to be located lower than the basin so that the water can run of f quickly as a result of the gradient.

According to a very suitable embodiment the device is provided with a manually guidable water hose which can be supplied with rinsing water from the cleaning water located in the device, via a dirt filter and a feed pump which can be switched on and off. The basin is preferably incorporated in a circuit which goes via a circulating pump and a dirt filter.

The air conveyed by the blower is also used for drying which is why according to a suitable embodiment it is heated in order to achieve faster drying. According to experience, a maximum duration of 1 minute should be estimated for the cleaning phase. In order to simplify the device or also its operation, it is thus appropriate that the blower and the heating device can be switched on and off jointly, especially as the air can then also temper the water and in addition, after the end of the cleaning phase the air will thereby already be at the temperature provided for the drying phase. On the other hand, the drying air should only come out when this is desired which is why a second branch of the air supply system, which is used for drying and which can be switched on and off separately, is preferably connected to the blower.

If the basin is emptied after the cleaning phase and the dog remains in the basin for the drying phase, the drying can at least be supported by the air flowing out of the first branch and in conjunction with the advantageous embodiment according to which the second branch of the air supply system has second air outlet openings which slope downwards and are arranged in the upper region of the inside of the side wall of the basin, such an efficient drying effect can be achieved that it is possible to dispense with the additional drying using a manually guidable air hose which can be acted upon with air as desired in order to make it possible to achieve additional drying in particular cases. On the whole this variant of the equipment is very comfortable. In this situation, according to a suitable embodiment the section having the second air outlet openings can be constructed as a height-adjustable framework running along the circumference of the basin for adaptation to the size of dog.

In the arrangement of the discharge region of the air hose, care should be taken to ensure that the out-flowing air causes no noise which could frighten the dog.

It is advantageous if a metering device to deliver an additive into the air flow is connected to the first branch of the air supply system, wherein the connection of the metering device to the first branch of the air supply system can preferably be switched on and off.

If the water hose is used for cleaning, it may be that because of the necessary access into the basin area, the edge of the basin cannot be placed far enough back to prevent water spraying onto the surroundings, especially as, having regard to the accessibility of the basin for larger dogs without using an entry aid, the possible height of the basin edge is limited. In this case, a further suitable embodiment helps whereby a removable spray protection wall which grips over the inner edge region of the side wall with a baffle sleeve can be placed on the upper edge of the side wall of the basin.

In order that the water can be used for a plurality of cleaning processes in a simple and inexpensive embodiment of the device without an additional collecting container, a very advantageous development consists in the fact that the intermediate bottom has a lifting device which is suitable for lifting the intermediate bottom together with the first branch of the air supply system arranged thereunder from its base position associated with the cleaning phase into a position associated with the drying phase, above the water level and for holding it there for a time so that the air outflow opening is located outside the water.

In order to prevent the dog from turning around during its stay in the basin, according a suitable embodiment a partition matched in height to the body size of the dog can be attached above the intermediate bottom in the longitudinal centre of the basin.

The air used to produce the bubbling bath is more suitably also used for the drying in the emptied cleaning container which is why a further suitable embodiment consists in arranging a change-over valve downstream from the blower which in a first position connects the blower only to the second branch and in a second position connects the blower to the first and the second branch.

In order to make the use of the device as easy as possible for the user, which is especially advantageous when, in hotel businesses, for example, a guest not yet familiar with the use of the device is recommended to use the device, the user should be unburdened as far as possible from controlling interventions in the function sequence.

Thus, especially if according to one possible embodiment, the emptying opening connects the basin to a collecting container, or if subject to suitable spatial conditions and given need, the device is connected to a fixedly installed water supply and removal system, it is easily possible for the person skilled in the art using commercially available circuitry to provide the device with a control circuit which is suitable for making possible a pre-definable automatic sequence of control functions wherein the control circuit should preferably contain at least time members to determine the cleaning phase and the drying phase. Then, for example, according to the size of dog, a certain program can be selected when the dog has been placed in the basin whereupon the cleaning phase and the drying phase proceed automatically and the dog only needs to be removed from the basin after the end of the program. In this case, selector buttons can be provided for special cases to make it possible to use the water hose or the air hose or a circuit which makes it possible to remove water from the collecting container and replace it with fresh water as required on the basis of a parameter such as the cloudiness of the water, wherein at least one flushing process for the collecting container can be inserted between two processes.

A suitable arrangement for the control of the device is if this is provided with a level sensor which is suitable for delivering a first signal when an adjustable maximum filling level is reached in the basin and after leaving this maximum filling level, delivering a second signal as soon as the emptied state of the basin is reached.

The level sensor is preferably connected to a control circuit for signal transmission which is suitable for controlling in accordance with the signals obtained from the level sensor and from an adjustable time switch member, at least the blower, possibly the heating, the duration of the cleaning and the drying phase and possibly the function of the feed pump for filling or emptying the basin.

A highly recommendable embodiment consists in providing a sensor allocated to the intermediate bottom which is suitable for delivering a signal when the water surface and the intermediate bottom come close before the air outlet openings of the first branch become immersed in the water and for switching on the air supply to the first branch by the signal. The contamination of the openings is thus avoided.

A further suitable further development consists in the fact that the control circuit is suitable for switching over the change-over valve into its position for supplying the second branch after the end of the cleaning phase and into its other position before the beginning of the cleaning phase.

It is particularly beneficial for a uniform construction of the bubbling bath that the intermediate bottom consists of a platform having perforations for the passage of air, on the underside of which at a distance therefrom there is located a region of the first branch of the air supply system having air outlet openings which comprises line sections parallel to one another having air outlet openings directed laterally and/or sloping downwards.

In order to be able to manufacture devices having different base areas of the basin with low production expenditure it is a suitable embodiment that the intermediate bottom consists of a group of base elements which are parallel to one another.

Under conditions of restricted space and also for safety reasons it can also prove advantageous that according to one variant, the blower is combined with heating and possibly with control, display and input elements to form an assembly which can be connected to the basin and its elements via supply, removal and control lines.

It is very expedient for maintenance and cleaning if the intermediate bottom with the part of the air supply system allocated thereto, having the air outlet openings, and possibly the lifting device are arranged removably in the basin wherein, provided that the respective design and dimensions allow, these can also be combined to form common removable units.

It has been found that important features of the invention can also be applied with considerable advantageous effect in the bathing of dogs, whether for cleaning or for veterinary medical treatment. The bubbling water which makes it possible to achieve thorough cleaning of the paws in a relatively short time without further support, also penetrates the fur of the dog and lifts its hairs from the skin and is thus suitable for distributing care or medicinal products added to the water more reliably, more uniformly and also to barely accessible parts on the skin without the massage conventionally required. The vertical mobility of the intermediate bottom, which in the device for cleaning paws particularly has the advantage that the water filling of the basin need not be renewed after each cleaning process because the air outlet openings for the bubbling bath can be lifted out of the water with the intermediate bottom so that no clogging of the openings need be feared after switching off the blower, can substantially facilitate the bathing process especially for large dogs because the dog can easily reach or leave the raised intermediate bottom, for example, via a ramp or step, which is lowered with the dog by a suitable lifting drive into a basin filled according to the size of the dog and after the bath is raised again with the dog into the starting position. The following advantages are thus obtained. The basin can be filled before the bath begins.

For large dogs filling a basin can require two to three hundred litres of water which means a filling time of up to ten minutes. The dog only remains in the bath during the actual bathing time of about two minutes and is then removed from the basin again. It is thus avoided that the dog spends an unnecessarily long time in the water. The blower for the bubbling bath is in each case switched on automatically before the intermediate bottom is lowered from its upper end position outside the filling region of the basin in order to prevent any clogging of the outlet openings for the bubbling bath after the immersion. The dog is gradually immersed in the water and is not frightened.

No physical effort is needed even to bring dogs having a body weight of 80 kg or more into the basin and remove them from the basin after the bath.

For veterinary medical applications the maximum size of dog must be taken as the starting point, so that the internal dimensions of the basin should have a length of about 900 mm, a width of 500 mm and a height of 800 mm. For equipment of this size and loading the lever mechanism already described is less suitable for the vertical movement of the intermediate bottom. An advantageous embodiment thus consists in the fact that lifting elements for the intermediate bottom, which can be synchronously moved vertically up and down by a central drive, are arranged in the four corners of the basin which is substantially rectangular in plan form.

An advantageous embodiment of the lifting drive consists in the fact that vertically arranged, rotationally drivable threaded spindles are arranged in the four corners of the basin, which each engage into a nut fixedly connected to a supporting frame for the intermediate bottom. For driving the threaded spindles each bears a chain wheel preferably in the area of its upper end wherein these chain wheels are in drive communication through a continuous chain. A drive element, preferably a motor drive, is associated with one of the threaded spindles. An inexpensive embodiment uses self-cleaning rolled threaded spindles which can be in engagement with plastic nuts. The chain wheels and the chain connecting them are covered by a covering hood which grips over the upper edge of the basin.

Especially when it is desired to attach the components used to supply and/or control the device, such as pump, blower, control electronics and/or a spray protection hood or the like at a sufficient distance above the basin and for this purpose to arrange supporting elements for these components in the area of the basin wall, another embodiment consists in the fact that vertical pillars associated with one another in pairs are arranged in the four corners of the basin so that a horizontal rod extends through the basin respectively between the two pillars of one pair, said rod being affixed to an element which can be moved vertically up and down on the column by a drive, wherein the two elements of each pair are coupled to the drive such that the two parallel rods are in each case at the same height and that the intermediate bottom is prepared on its sides facing the rods for detachable supporting on respectively one of the rods. The drive can be manual, e.g. by a preferably geared-down shaft, or motor-driven. According to a suitable embodiment the pillars are shaped as hollow profiles having a rectangular cross-section, in whose interior a rack in engagement with a driving pinion can slide up and down wherein the ends of each rod engage through a vertical slit in the hollow profile into the two pillars allocated thereto and are fixedly connected to the rack at that point. The drive is associated with one of the pillars and is connected to the driving pinions on the other pillars using means for slip-free transmission of movement. A very stable and swing-free guidance is thereby obtained for the intermediate bottom.

The dog tends to get rid of the wetness by shaking vigorously as soon as it has left the water. Thus, spray protection is preferably provided which shields the region above the basin edge when the dog is lifted up from the water together with the intermediate bottom. For this purpose the racks can, for example, be provided respectively at their upper end with a holder which grips through the slit for a spray protection which can be detachably connected thereto, which can be released from the holders during the bath and lowered completely in order not to hinder access to the dog. Before lifting the intermediate bottom the spray protection is connected to the holder and then pulled upwards by the racks.

In the embodiment with threaded spindles, spray protection can be detachably connected to a retaining clamp and the retaining clamp detachably affixed to the vertically moveable supporting frame such that in its lowest position it is lowered as far as the area of the basin edge.

If a large dog does not leave the water very quickly after the end of the bath, whether as a result of rapidly emptying the basin or by rapidly raising the intermediate bottom, considerable quantities of water can be flung in the vicinity of the basin when the dog shakes itself despite the spray protection. This can be prevented by providing a closed covering hood which covers the region above the edge of the basin when the bath is ended and at the same time provides sufficient space to accommodate the dog lifted out of the water. In contrast to the design with racks which slide out of the basin as the intermediate floor is lifted upwards and whose guides thus project upwards over the basin edge, the spindles do not take up any space above the basin which is why it is particularly easy to attach such a covering hood in the latter case.

However, a cover which is expandable with scissor-like horizontally retractable arms and is provided with apron-like side elements can also be arranged on a rear wall of the device which is used as spray protection and projects upwards over the edge of the basin.

Since in veterinary medical applications a fresh bath must be prepared for each dog to be treated and the level, relative to the bath position of the intermediate bottom, varies considerably according to the size of the dog to be treated, for economic reasons it is appropriate to provide a standard bath position of the intermediate bottom for all sizes of dog, namely the lowest possible operating position of the intermediate bottom. As a result, the device is used with the minimum filling quantity required in each case. In the case of larger dogs the filling takes some considerable time which is why it is advantageous to automatically end the filling process when the pre-determined filling quantity is reached. For this purpose a preferred embodiment consists in the fact that a filling line associated with the basin contains a check valve which can be switched into a locking position by a sensor moveable jointly with the supporting frame as soon as the sensor dips into the water and that markings associated with one another are applied to the vertically movable equipment part on the one hand and to the fixed equipment part on the other hand, on which the water level corresponding to the respective sensor position can be read off.

This makes it possible to position the intermediate bottom before the filling process such that the filling process is automatically ended when the desired water level is reached. In this situation, the circuit of the check valve is configured such that this stays closed after the transfer to the locking position triggered by the sensor until it is released for opening again by an arbitrary control command. As a result, the check valve stays closed when the intermediate bottom is raised above its position marking the level, as for example to transfer the dog in its upper end position.

It must also be anticipated that in veterinary medical practice dirty dogs need to be treated so that if necessary, a cleaning bath must be incorporated before the treatment with a therapeutic bath. In order that the basin need not be filled twice which is associated with considerable expenditure of time and water in the case of large dogs, it is appropriate to fit the device with a device for showering the dog. This can be a hose with a shower nozzle supplied via a pump, and it is advantageous to have a fixedly installed shower device which comprises two ring lines each running in a horizontal plane along the basin edge at different levels, wherein the lower ring line is provided with upwardly sloping spray nozzles and the upper ring line is provided with downwardly sloping spray nozzles. Such a shower device can be used especially advantageously when the dog is to be cleaned of residue from the treatment means used after the therapeutic bath because the fur is thereby automatically thoroughly cleaned after draining the bath.

Preferably, a second sensor which responds to the water filling is moveable together with the supporting frame, which switches on the supply of blower air to the air outlet openings before the air outlet openings dip into the water filling of the basin during the downward movement of the supporting frame. This ensures that any contamination of the air outlet openings is reliably prevented.

These and further advantageous features of the invention are explained in further detail with reference to the following description of the exemplary embodiments of the invention shown schematically in the drawings. In the figures:

FIG. 6 is a schematic plan view to show the position of a partition wall and a level sensor.

Figure 1:
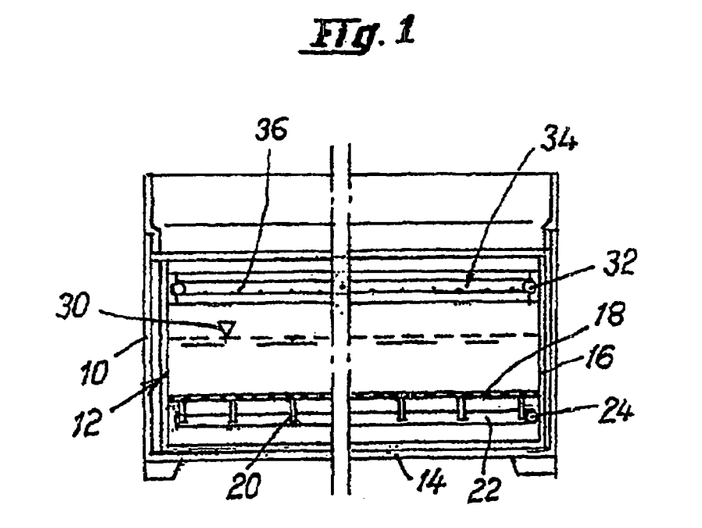
FIG. 1 is a schematic longitudinal section through a device according to the invention intended for cleaning dog paws, restricted to the important features.

In the embodiment shown in FIG. 1, the device according to the invention comprises a tub-like basin 10 in whose interior there is arranged an upwardly removable insert designated overall as 12, which has as its essential elements a supporting frame 16 mounted on the bottom 14 of the basin 10, which bears a perforated intermediate bottom 18 at a distance from the bottom 14. On its underside the intermediate bottom 18 is provided with holders 20 for air pipes 22 which belong to a first branch of an air supply system explained in detail hereinafter, which is designated overall as 24. As can be seen from FIG. 9, the pipes 22 are provided with downwardly directed first air outlet openings 26 and preferably such that they are directed obliquely downwards towards opposite sides. The pipes 22 can in each case consist of a plastic hose which is preferably constructed as non-round with a flat base 28 so that it is ensured during assembly that the outlet openings 26 are aligned as provided. The holders 20 can be constructed as cross-pieces which have openings for pulling in the pipes 22. However, clamps for snapping in the pipes 22 can also be provided for example.

During cleaning of the paws the dog stands on the intermediate bottom 18 and the basin is filled with water until the paws are covered, which is indicated by the level 30 for example. The pipes 22 are held by the holders 20 at a vertical distance from the underside of the intermediate bottom 18 so that the air being distributed in the water and ascending in a bubbling fashion is not prevented from penetrating upwards through the intermediate bottom 18 in the region above the pipes 22. The perforations in the intermediate bottom 18 must on the one hand allow dogs of different size to stand securely and on the other should allow the air to be distributed as uniformly as possible.

Attached at a vertical distance above the bottom surface of the intermediate bottom 18 on the supporting frame 16 is a frame-like section of an air pipe 32 running horizontally and parallel to the side walls of the basin 10, which is associated with a second branch 34 of the air-supply system. The frame-like section is provided with obliquely inwardly directed second air outlet openings 36. In order that the air flow emerging from the air outlet openings 36 achieves an optimal effect, the frame-like section is mounted vertically adjustably on the insert 12 so that it can be adapted to the respective body size of the dog to be cleaned.

After the dog is located on the intermediate bottom 18 and the desired water level is present, air is blown into the water from the air supply system via the pipes 22 and the first air outlet openings 26, said air being distributed and rising upwards in a bubbling and thereby releasing dirt adhering to the paws. After a maximum of 1 minute, the cleaning phase is ended. The water is removed from the basin 10. As the water level drops, the pressure is maintained in the first branch 24 in order to prevent the penetration of dirt into the air outlet openings 26.

When the water has been emptied, the second branch 34 is supplied with compressed air at the same time as the first branch 24 so that the paws are supplied from below with drying air from the air outlet openings 26 whereas the air emerging from the openings 36 from above presses the moisture downwards and assists the drying. After the end of the drying phase, the device is switched off.

If the paws are only slightly dirty, the water is so barely contaminated that this can be reused for a plurality of successive cleaning processes. In order to prevent any clogging of the air outlet openings 26, these must not remain in the water when there is no air pressure in the pipes 22. For this reason, as shown schematically in FIGS. 2 and 3, the intermediate bottom 10 can be raised out of the water together with the pipes 22 so that the water can stay in the basin until the next cleaning process. In this case, the dog is removed from the basin for drying and is dried by means of an air hose 38 which can be acted upon from the second branch 34, which is shown in FIG. 6.

Figure 2:
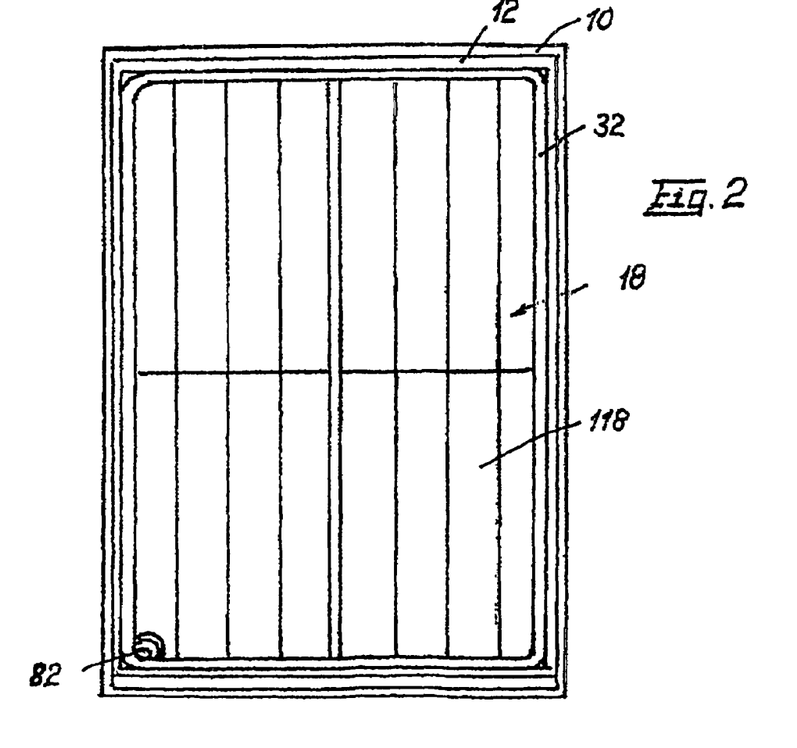
FIG. 2 is a plan view of the device from FIG. 1
Figure 3A:
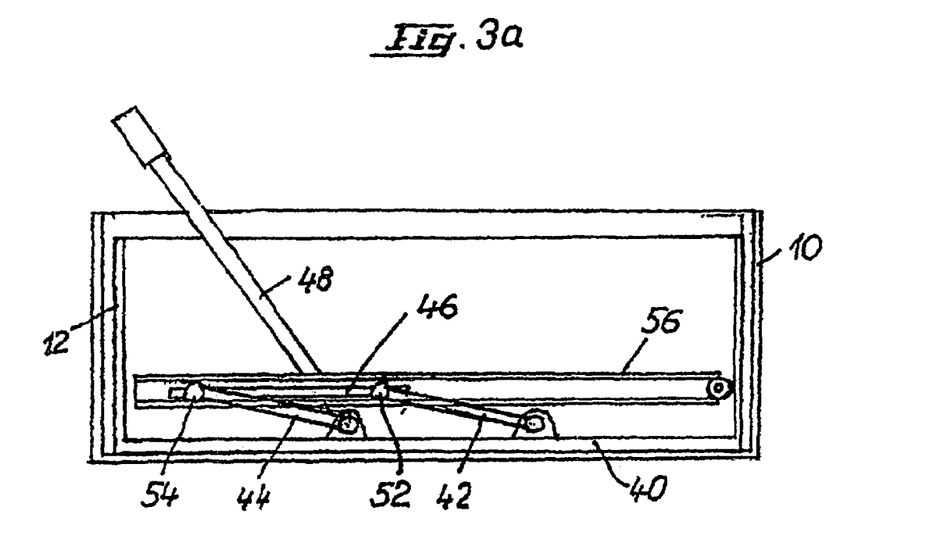
FIG. 3a is a schematic section similar to FIG. 1 through a device with an adjustable-height intermediate bottom in the cleaning position.
Figure 3B:
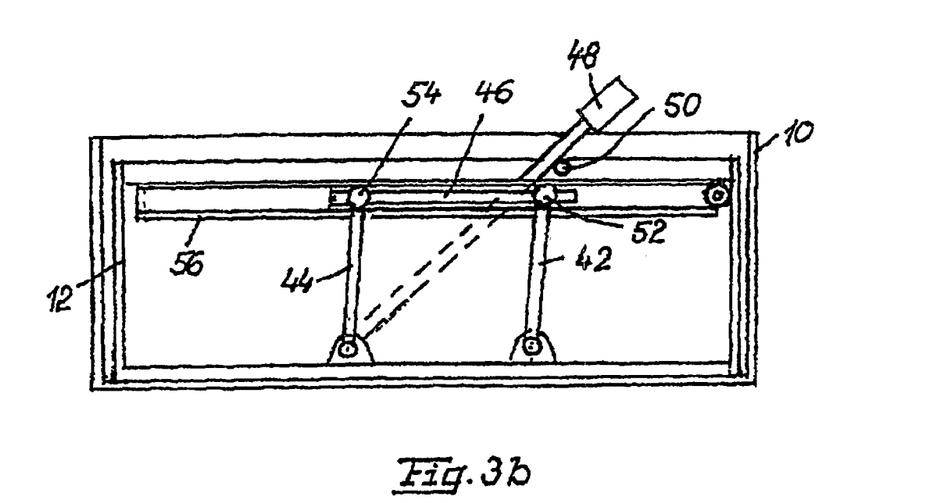
FIG. 3b is a section through the device from FIG. 3a in the drying and rest position.

In order that the intermediate bottom can be moved vertically, two parallel pairs of levers 42 and 44 are mounted on a rectangular base frame 40 of the insert 12, with a spacing in the direction of their longitudinal sides, such that their one end can be tilted about horizontal axes parallel to the transverse sides. The other ends are flexibly connected to a lifting frame 46 so that two hinge parallelograms are formed parallel to the two longitudinal sides. In the lower end position the lifting frame 46 is adjacent to the base frame 40. In this position a hand lever 48 connected rotationally fixedly to a lever pair 44 but offset at an angle projects obliquely upwards such that it is located close to the one transverse side inside the vertical region delimited by the upper edge of the basin. If the hand lever 48 is tilted as far as a stop 50 assigned thereto on the insert 12, so that it projects obliquely upwards in the other direction, the lever pairs 42 and 44 move upwards and briefly go over the upper dead-point position so that the lifting frame 46 is finally located in its upper stable end position. In this situation the lifting frame 46 has moved towards the longitudinal sides. The lifting frame is thus provided with pairs of rollers 52 and 54 rotatable about the axes between the lifting frame 46 and the lever pairs 42 and 44, which engage in U-profiles 56 serving as guide rails on the two longitudinal sides of the intermediate bottom 18 so that the lifting frame 46 can move in the guide direction during its vertical movement towards the intermediate bottom 18.

In order that the intermediate bottom 18 is not pressed against the wall of the basin in the guide direction and slides along in the vertical direction under frictional contact, which can lead to damage, the intermediate bottom 18 is provided with supporting rollers 58 on one transverse side.

As has already been described initially, it is sometimes desirable to clean not only the paws but also the dog's belly, for example which is why it improves the usefulness of the device if water can be guided to the contaminated point by a hose. For this reason it is logical to fit the device with a pump which is suitable for making a cleaning jet emerge from a hose which can be directed manually towards the contaminated point, from water present in the device. Thus, at the same time a means is available with which the basin can be emptied after the cleaning phase.

For this purpose, the hose, possibly by means of an extension, can be connected to a suitable water drain or the water can be pumped into a container. In this situation, this can also be a collecting container incorporated in the device from which water can be taken for the next cleaning process so that the water can be used many times without the device for raising and lowering the intermediate bottom shown in FIGS. 2 and 3 being necessary.

Figure 4:
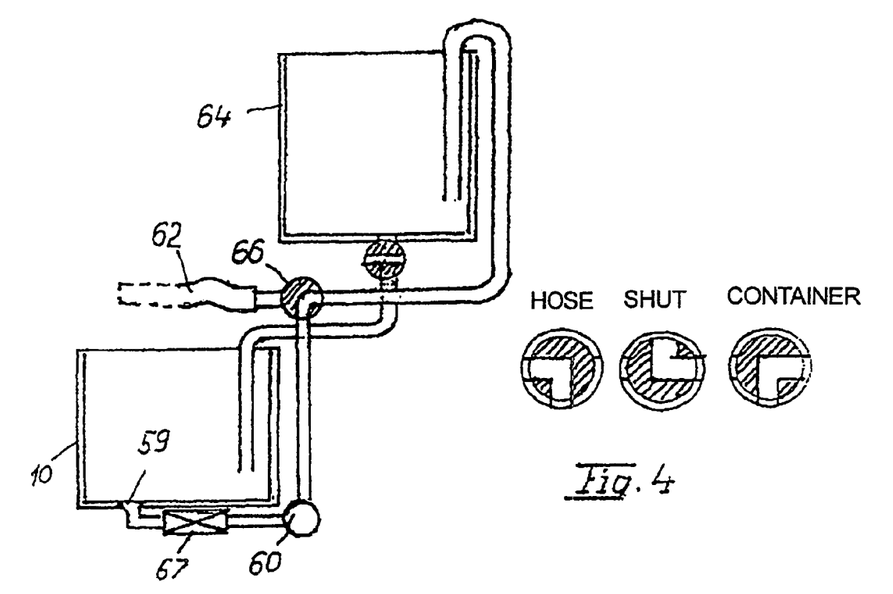
FIG. 4 is a schematic circuit for the water supply and removal of water from the device.

FIG. 4 is a schematic diagram showing a circuit with a pump 60 connected to a lower draining opening 59 of the basin 10, a water hose 62 used for additional cleaning and a collecting container 64 wherein a changeover valve 66 connects the delivery side of the pump to the hose or the collecting container as desired or shuts off in a middle position. A dirt filter 67 is incorporated before the pump 60. If the water is to be renewed, the water hose 62 can be used to empty the water from the basin 10 into a drain pipe.

In order that the dog can easily be brought into the basin, this should most suitably be positioned at ground level as far as possible. Thus, it is only rarely possible to arrange a collecting container under the basin such that the water can drain into the collecting basin after opening a fast-emptying valve without additional conveying means.

Should such an arrangement be possible, the pump would be switched so that the water can be sucked from the collecting container and can be conveyed through the valve in a controlled fashion into the basin or into the water hose.

If the collecting container 64 cannot be positioned underneath the basin 10, it is more suitably arranged so far above that the water can flow off from the collecting container 64 into the basin under the action of the head, as shown in FIG. 4.

Figure 5:
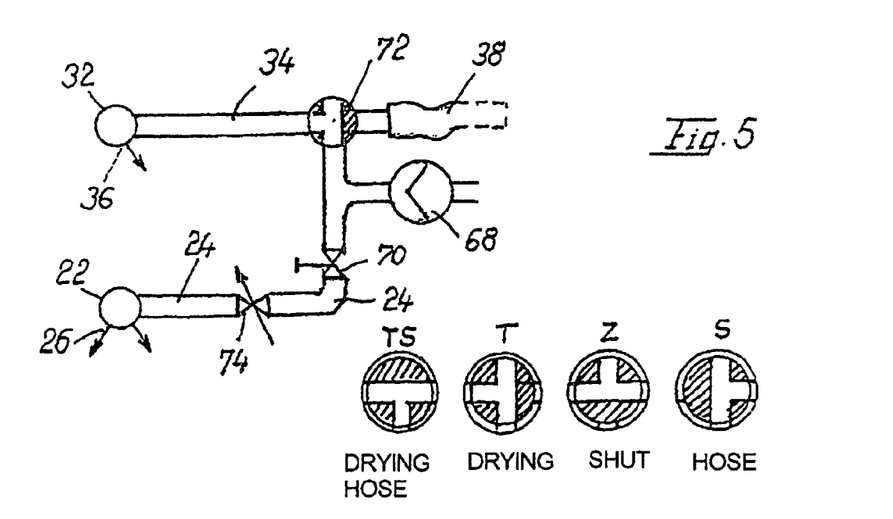
FIG. 5 is a schematic circuit of the air supply for a comfortably fitted variant of the device.

The device is supplied with air for the bubbling bath and also for drying the dog by a blower 68 whose delivery side is connected to a first branch 24 for the bubbling bath and a second branch 34 for the drying. Since during the cleaning phase the air from the blower 68 should only come out via the first air outlet openings 26 and during the drying phase via the first air outlet openings 26 and the second air outlet openings 36 and if necessary, also via the air hose 38, or however, if the dog to be dried is located outside the device, via the air hose 38 alone, the air supply system branches on the delivery side of the blower and opens into the first branch 24 and the second branch 34, each of which can be opened or closed independently of one another by means of a valve 70 or 72.

In order that the pressure can be adjusted to an optimum value according to the possibly different water level depending on the size of the dog, the check valve 70 is followed by an adjustable throttle 74.

Whereas the valve 70 is a pure check valve which switches the bubbling bath on or off, the valve 72 is constructed as a multiple-way valve which either shuts off the second branch 34 or offers three possibilities for supplying it with air. The second branch 34 is closed when the valve 72 is in a central closed position Z. If it is turned anticlockwise from this closed position, a first open position T is first reached in which the air pipe 32 is connected to the blower 68. If the valve 72 is turned further in the anticlockwise direction, a second open position TS follows in which the air hose 38 is acted upon in addition to the air pipe 32. By turning from the closed position Z in the clockwise direction, a third open position S is reached in which only the air hose 38 is connected to the blower 68 provided that the valve 70 is closed and the bubbling bath is ended. This position will be used if the dog is to be dried outside the basin. If the dog is still located outside the water on the intermediate bottom in the drying phase, drying air can be blown towards the dog from below when the valve 70 is open and at the same time, when the valve 72 is in position T, air can be blown onto the dog from above from the pipe 32 but in position TS, the hose 38 can also be used in addition.

A heater 76 for the conveyed air, which is switched on and off at the same time as the blower, is preferably arranged before the branching on the delivery side of the blower 68.

For the care of dog's paws it is advantageous if they are treated with a care oil after washing. Thus, a metering device 78 is connected to the air pipe 22 wherein the connection is set in operation when the drying process is carried out. The metering device 78 is thus switched on and off jointly with the branch 34. When it is switched on, the metering device 78 delivers a pre-adjustable quantity of an additive which is blown towards the paws from below by the air flow.

A partition affixed to the insert 12 is arranged in the vertical longitudinal central plane of the basin 10 above the intermediate bottom 18, which prevents the dog placed in the basin 10 from being able to turn round.

Figure 6A:
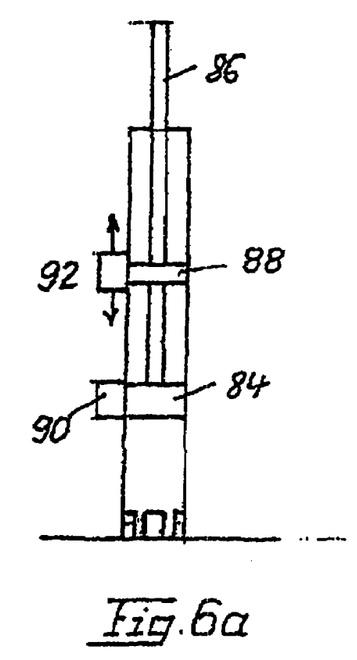
FIG. 6a is a schematic diagram of the level sensor at maximum filling.
Figure 6B:
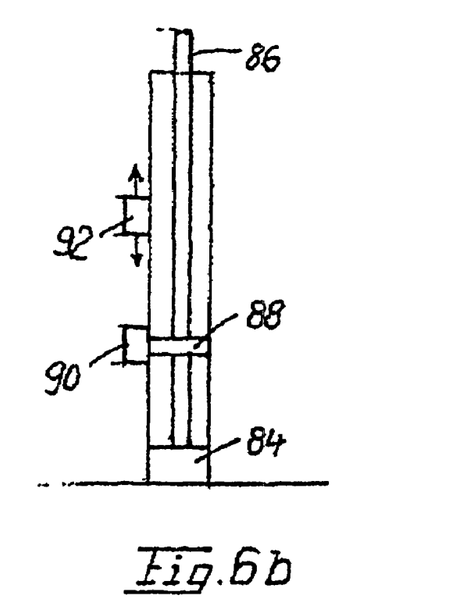
FIG. 6b is a schematic diagram of the level sensor when the container is emptied.

A control circuit designated in total as 80 makes it possible to achieve a largely automatic sequence of the cleaning and drying process. For this purpose it is appropriate to be able to determine whether the pre-determined water level in the basin 10 is reached or whether the basin is emptied. Located inside the container is a level sensor 82 which, for example, can consist of a vertically guided float 84 with a guide rod 86. If the float 84 is in its lowest position which it only reaches when the basin 10 is emptied, a marker 88 on the guide rod interacts with a fixed sensor element 90. A vertically adjustable sensor element 92 is used to mark the desired water level which is selected according to the size of dog.

Both sensor elements 90 and 92 are connected to the control circuit 80 which is not shown in detail since it involves conventional control technology.

According to the requirements imposed, the device can be used in various stages of development. If it is to be used in a private household only for a single dog of a certain size, the expenditure is to be kept low and there are no particular facilities available for supplying and removing water at the site, a simple design without fixedly installed water supply and removal without an automatic process sequence and possibly without the possibility of using the cleaning water many times may be sufficient.

Then, approximately the quantity of water required for this dog for cleaning will be prepared in a container and poured into the basin before the cleaning and after the cleaning the water will be conveyed back into the container via a drain opening or by means of the pump present as an accessory and then removed. On the other hand, if the device is used in a hotel or a multiple dwelling, for the dogs of guests or inhabitants, whose dogs may be very different size, the cleaning must take place using different quantities of water graded according to the size of dog. In addition, apart from selecting a program matched to the size of dog, the smallest possible own effort should be demanded of the dog owners especially in a hotel, i.e., the cleaning and drying process should proceed automatically as far as possible. In such an application a fixed location can be provided for the device and this location can be equipped with a fresh water supply and a drain for used water and the device can be connected to this.

Figure 8:
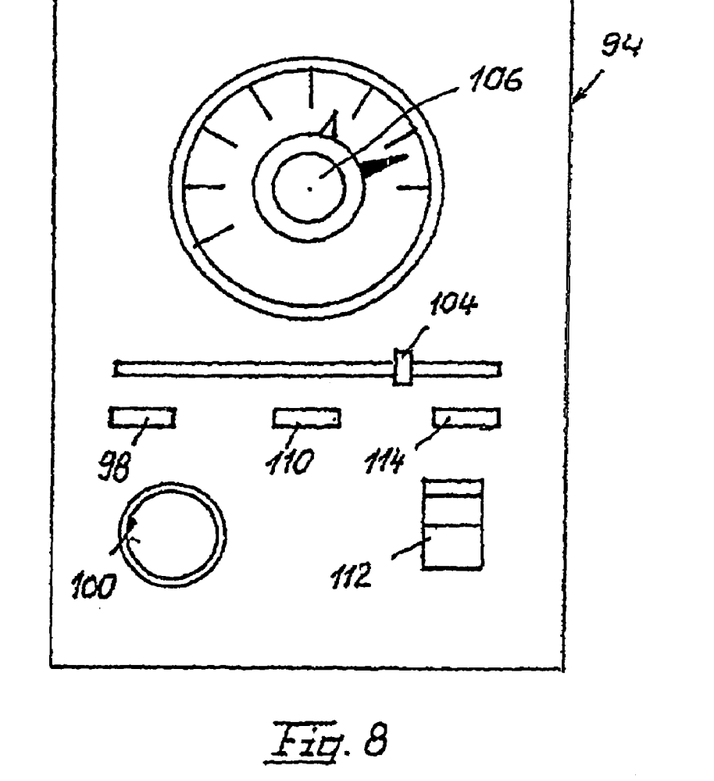
FIG. 8 is a front view of an embodiment of a controller with display and control elements.
Figure 9:
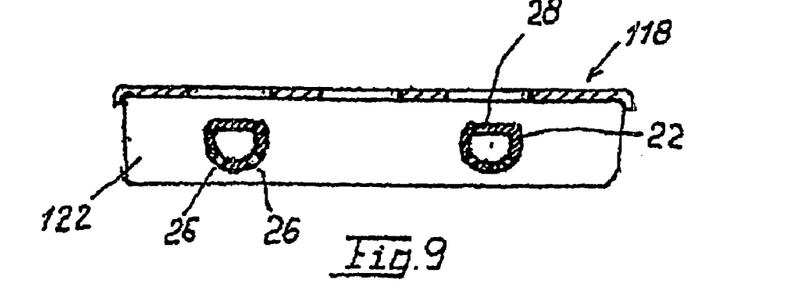
FIG. 9 is an enlarged cross-section through an element for forming the intermediate bottom.

For example, it is indicated with reference to FIGS. 8 and 9 which equipment can be provided for comfortable operation of the device. In this case, the electrical function units can be largely combined in a controller 94 which can be kept reliably separated from the moist area of the device.

In a simpler design the controller 94 can for example be affixed to a wall as a separate unit at sufficient distance from the basin 10 for safety, wherein only the air hoses connected to the blower 68 located in the controller and associated with the first branch 24 and the second branch 34 and a signal lead 96 for monitoring the water level run between the basin 10 and the controller 94.

Figure 7:
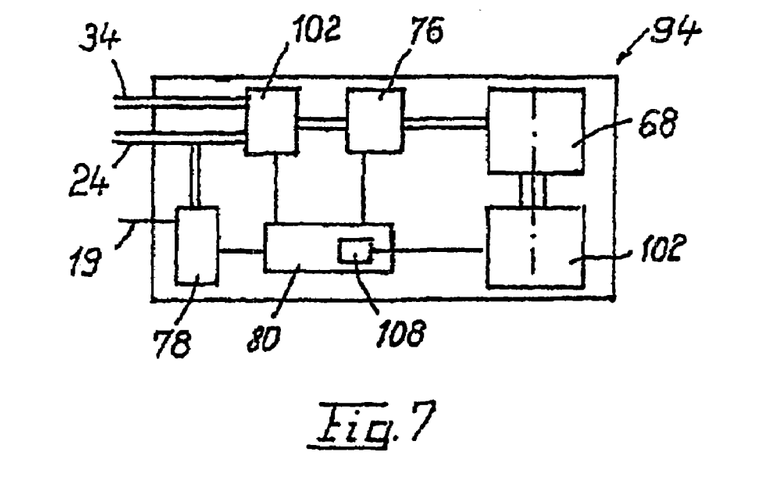
FIG. 7 is a schematic arrangement of the elements combined in the controller.

A higher-performance controller 94 is described with reference to FIG. 7. In this case, the valves 70 and 72 and the throttle 74 shown in FIG. 5 are combined as a block 102. As soon as the water level in the basin 10 has raised the float 84 so far that the marking 88 reaches the position of the sensor element 92, a control signal is triggered and passed via a line 19 to the control circuit 80 (FIG. 7) which activates a diode 98 on the control panel of the controller 94 which indicates by its lighting up that the cleaning process can be started.

When it has been confirmed that the dog is correctly placed, the start button 100 can be pressed. Thereupon the control circuit 80 only connects the blower 68 to the first branch 24 of the air supply and then activates a continuously controllable motor 103 to drive the blower 68 in a cleaning stage. The delivery efficiency of the blower 68 in the cleaning stage is adjusted by means of a slider 104. It is adapted to the water level deemed as suitable according to the build of dog such that air conveyed via the air pipe 22 and emerging through the air outlet openings 26 produces a bubbling without spraying. The desired cleaning time and if necessary the desired drying time can be set beforehand via a rotary button 106 which is monitored by a time switch member 108. These settings can also be made automatically electronically starting from the actual level which has been determined.

However, in the controller it is also possible to provide a plurality of fixedly programmed operating sequences tailored to different sizes of dog wherein each stage is assigned a specific water level and a specific blower capacity. If necessary, the cleaning and/or the drying time can also be fixedly predefined. The control panel will then have buttons to select the respective cleaning program. A possibility for selecting between programmed operation and individual setting can also be provided.

After the cleaning time has elapsed, the air pressure in the pipe 22 can be lowered by means of the throttle 74 or the blower efficiency can be correspondingly lowered and then the cleaning container can be emptied by opening a drain valve or pumping away.

As a result of emptying the basin 10, the float sinks so far that the sensor element 90 is activated whereby the valve 72 is changed over so that the blower 68 is now in communication with the two air supply pipes 22 and 32. The delivery efficiency of the blower is increased to the maximum and the heating device 76 is switched on.

After the drying time has elapsed, the blower 68 and the heating device 76 are switched off, the valve 72 is closed and if necessary, it can be indicated by the lighting up of a diode 110 that the cleaning process is ended.

In order to separate the device from the mains, an on/off switch 112 can be provided and a diode 114 can indicate that the device is live.

In order to simplify the manufacture of different sizes of equipment, the intermediate bottom 18 can be formed by joining together a larger or smaller number of base elements 118 (FIG. 6). These elements have a perforated cover strip 120 on whose underside a plurality of holders, approximately in the form of cross-pieces 112, are provided in the longitudinal direction of the elements 118, into which the pipes 22 can be inserted after assembling the elements 118 in a framework corresponding to the shape of the intermediate bottom 18.

FIGS. 10 to 13 show a device for implementing the method according to the invention, such as is especially advantageous in veterinary medicine. There it is not a question of cleaning the paws of a dog, possibly several times a day but of giving dogs of various sizes a full bath with the lowest possible expenditure of time and effort, as a result of which not only a thorough cleaning takes place but if necessary medication or care products can be brought onto the skin through thick fur. This can ideally be achieved through a bubbling bath wherein according to the invention it is possible to have a bubbling bath without the need to carry out the extensive preliminary and after work which presently makes a bubbling bath extremely uneconomical.

Figure 10:
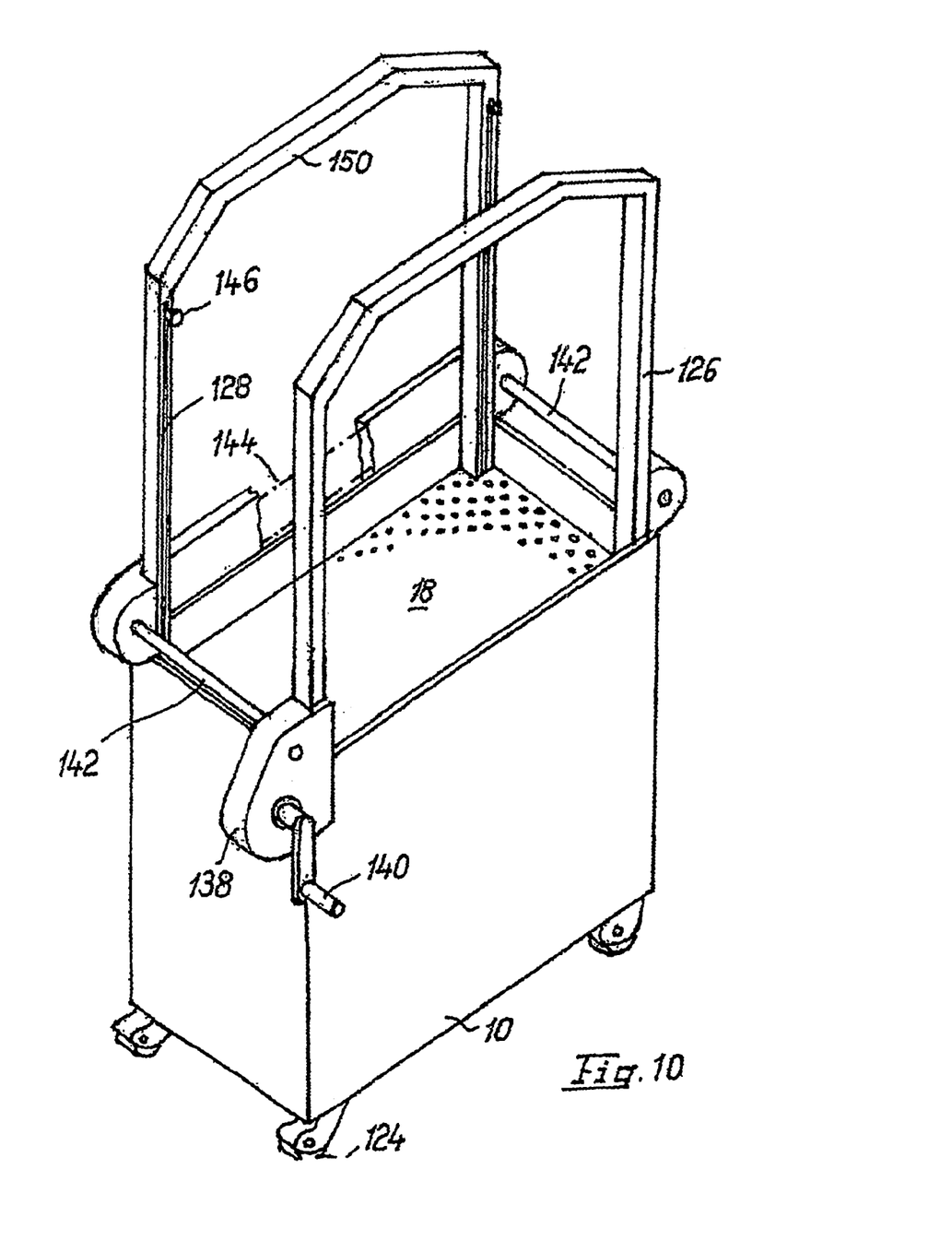
FIG. 10 is a schematic perspective view of an embodiment of the device according to the invention which makes it possible to give the dog a full bath and is especially suited for veterinary medical application.

The device according to FIG. 10 has a basin 10 matched to the maximum size of dog. This is easily movable by swivelling rollers 124. The device can be held in the selected position by a manually operated brake 125.

Figure 11:
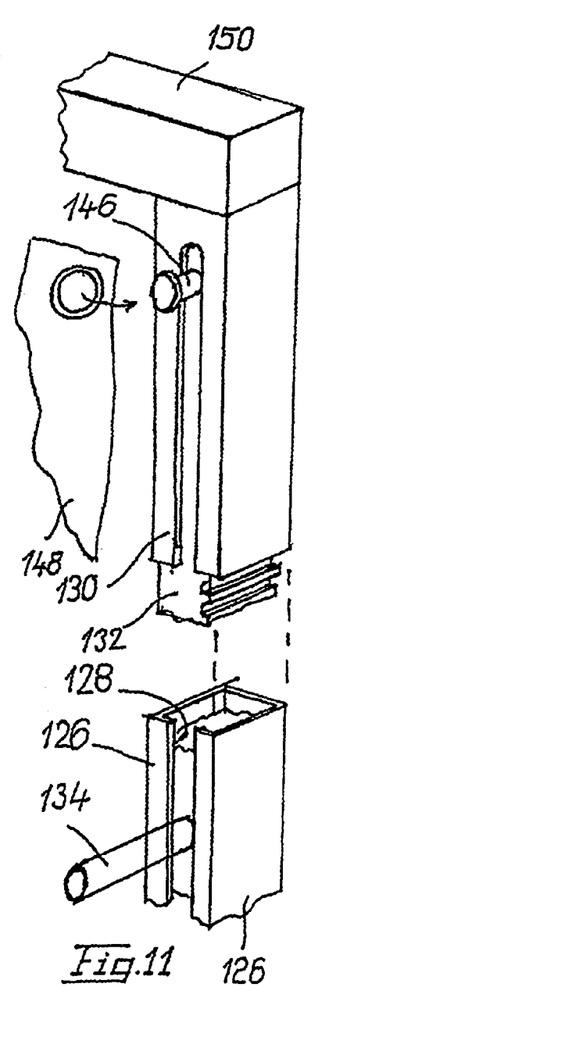
FIG. 11 is a partly cutaway perspective view of a pillar guiding a rack.

Arranged on the inside of the four corners of the basin 10 are vertical pillars 126 made of rectangular cross-section hollow profiles which each have an open vertical slot 128 on one side surface 130 and which are assigned to one another in pair such that in each of these two pairs of pillars the open side surfaces 130 face one another. The pillars 126 of a pair preferably lie opposite to the short sides of the basin 10. In the inside of each pillar 126 a rack 132 (FIG. 11) is guided displaceably in the vertical direction wherein polyamide sliding plates are provided in the guide region for easy mobility. The racks 132 are arranged such that one of their flanks lies behind the slot 128. The racks 132 of one pair are each connected by a horizontal rod 134 which passes through the slots 128 (FIG. 11). The intermediate bottom 18 is provided on its corresponding parallel edges with respectively one downwardly opening U-shaped profile 136 (FIG. 13) which is suitable for gripping over the rods 134 so that the intermediate bottom 18 can be lowered and raised according to the movement of the racks 132 and if necessary, it can be raised from the rods 134 for cleaning work.

In order to move the racks 132, one of the pillars 126 has assigned to it a drive not shown in detail, which is designated overall as 138, which engages with a pinion into the rack 132 concerned through an opening provided for this purpose in the pillar 126. A manual crank 140 can be used to actuate the drive 138 but a motor drive is also possible. Bearing in mind the load of about 80 kg to be moved with large dogs, a reduction of for example 1:3 between a manual crank 142 and pinion 140 is recommended.

In order to move the racks 132 completely synchronously, each rack 132 has a pinion with a forced synchronism of these pinions being provided. The pinions of a pair of pillars can be connected by a common shaft 142 and these shafts 142 connected by a chain drive 144. The shafts each lie outside the basin edge and thus engage in the pillars from opposite sides which is why the chain drive contains an intermediate wheel not shown to reverse the direction of rotation.

The manual crank 140 must have a back stop so that the raised intermediate bottom cannot sink downwards as a result of its weight and its load.

A holder 146 which projects outwards through the slot 128 can be provided at the upper end of each of the racks 132, on which a spray protection 148 can be affixed, possibly a curtain or a screen made of acrylic glass which is pulled upwards as the intermediate bottom is raised and collects the spray water when the dog shakes itself on leaving the basin 10.

The pillars 126 can be connected at the upper ends by possibly removable beams 150 which run horizontally, parallel to the longitudinal sides of the basin. The beams can carry a console on which additional equipment such as pump, blower and control system can be arranged.

On one of the pillars 126 the rack 132 has an end switch assigned to it which ensures that the air intake into the first branch 24 of the air supply system is opened before the intermediate bottom 18 dips into the liquid located in the basin so that at all times dirt particles are prevented from lodging in the air outlet openings.

Figure 15:
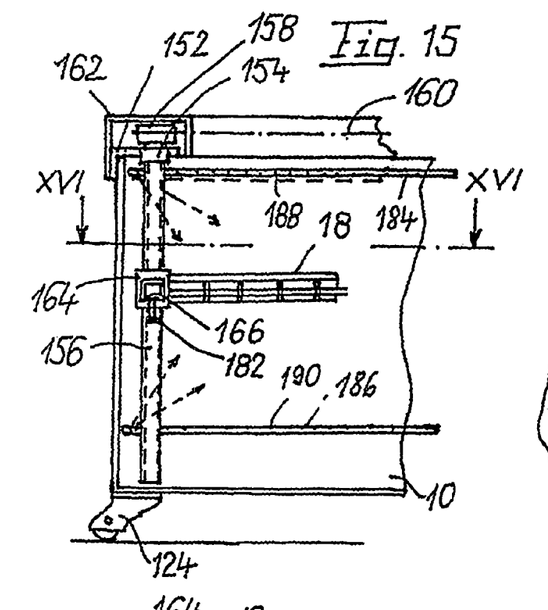
FIG. 15 is a vertical section through the corner region of the device with a spindle drive for the intermediate bottom and FIG. 16 is a section along the line XVI—XVI in FIG. 15.
Figure 16:
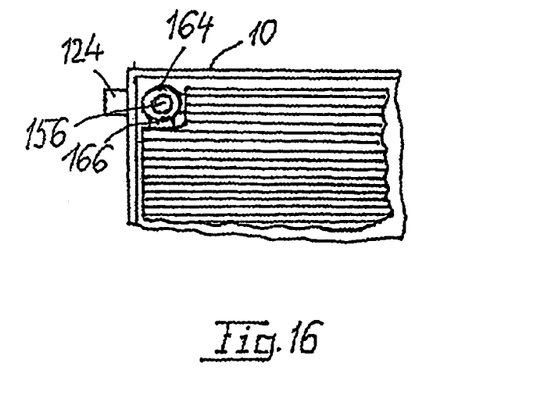

If the upwardly projecting pillars 126 are perceived as interfering, the version shown in FIGS. 15 and 16 can be used instead of the lifting drive fitted with racks 132.

Located on the upper edge of the basin 10 is a frame 152 which has a bearing 154 in each of the corner regions in which a rolled threaded spindle 156 is rotatably mounted. Such spindles with rolled-in threads are relatively expensive. They can be constructed as self-cleaning by means of a milled-in longitudinal groove so that the spindle drive also stays ready for operation in dirty water.

Above the frame 152 a chain wheel 158 is connected rotationally fixedly to each spindle 156 wherein the chain wheels 158 and a drive also provided with a chain wheel are connected by a continuous chain 160. Chain wheels 158 and the chain 150 are covered by a covering hood 162 which grips over the upper edge of the basin. The spindles 156 engage in nuts 164 which are tied into a frame 166 which carries the intermediate bottom 18. The intermediate bottom can be raised and lowered by turning the spindles 156.

It is advantageous if a precaution is taken which allows the vertical position of the intermediate bottom 18 to be read off. For example, a scale with markings movable up and down with the intermediate bottom 18 can be applied to the inside of the basin which makes it possible to read off the position of a sensor 182 possibly attached to one of the rods 134 or the frame. This sensor 160 causes the check valve arranged in the water intake to the basin 10 to close as soon as the rising water in the basin reaches it. The water intake thus requires no continuous monitoring during filling of the basin 10. The check valve remains in its locking position until it is opened by an operator to allow water to flow to the basin 10 again. This prevents the water intake from opening automatically when the intermediate bottom 18 is raised to accommodate the dog in its uppermost position and then transfer it to its lowermost position for the bath.

FIG. 15 shows two ring-shaped pipes 184 and 186 which can be acted upon by pressurised water so that water jets directly obliquely downwards can emerge from the upper pipe 184 through spray openings 188 and water jets directed obliquely upwards can emerge from the lower pipe 186 through spray openings 190 through which the dog located in the basin 10 can be showered if necessary.

Figure 12:
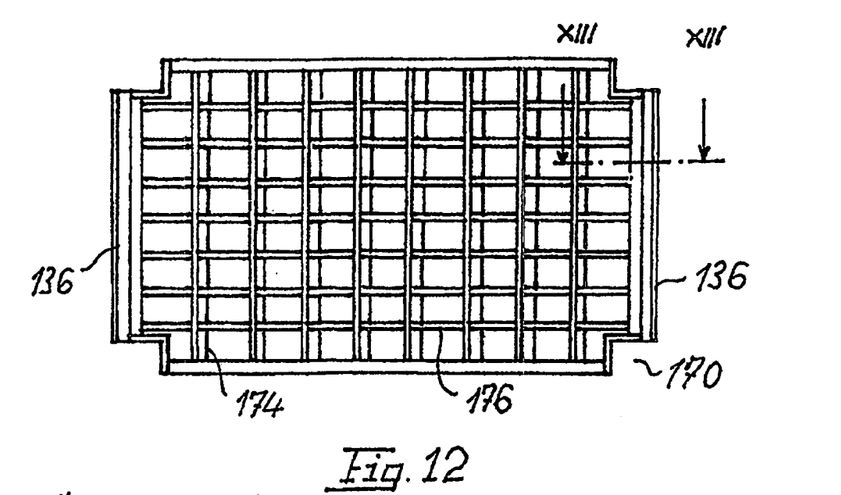
FIG. 12 is a view from below of an intermediate bottom of the device from FIG. 10.
Figure 13:
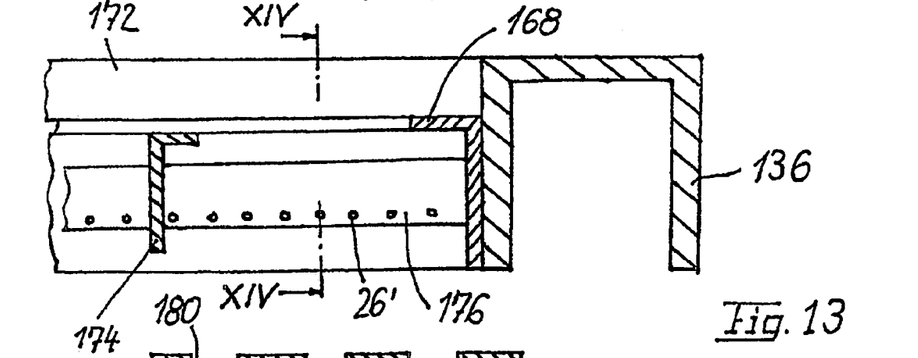
FIG. 13 is a detailed section along the line XIII—XIII in FIG. 12.
Figure 14:
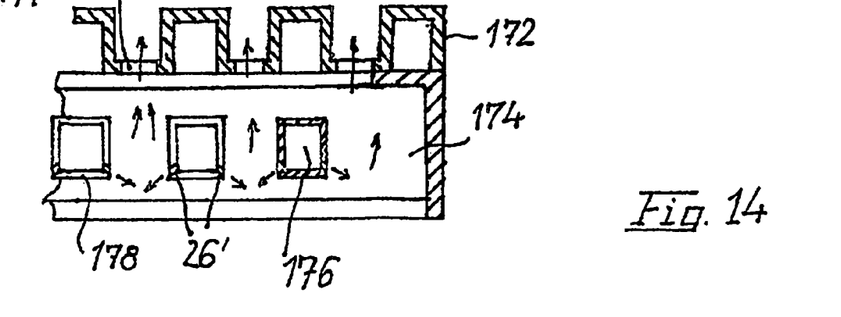
FIG. 14 is a detailed section along the line XIV—XIV in FIG. 13.

The intermediate bottom 18 for the embodiments from FIGS. 10 to 15 is shown in detail in FIG. 12. This has a frame 168 with corner recesses 170 for the pillars 126 or the spindles 156. The frame is provided with the U-shaped profiles 136 on both narrow sides. It is covered by a base 172 (FIGS. 13, 14) on whose underside transversely running strips 174 carry air guiding channels 176. These channels 176 have an approximately square cross-section and the air outlet openings 26' are located directly above the base 178 of the channel 176 on both longitudinal sides so that on the one hand, the air is blown out laterally which produces a very good turbulence effect and at the same time offers protection to the openings from sinking suspended material, and in addition this arrangement makes it possible for water which may have penetrated into the channel 176 during lifting of the intermediate bottom 18 from the water, to flow downwards which is assisted by the blower air. In order that large and small dogs have an equally secure position on the intermediate bottom 18 and do not prevent the ascent of the bubbling water by their paws, the intermediate bottom 18 is preferably provided with an upper cover plank 172 made of corrugated material whose corrugations are configured approximately rectangular in cross section wherein perforations 180 for the passage of air are constructed on the base of the corrugations whereas the dog stands on the crest of the corrugations and thereby keeps a distance from the perforations 164.

Tests have shown that perforated sheet having a maximum hole diameter of 3.5 mm is best suited for shaping the upper side of the intermediate bottom because on the one hand there is no risk that the dog will catch its claws in the perforations and because on the other hand the large number of openings thereby made possible but of limited cross-section promotes a very uniform distribution of the bubbling effect but prevents spraying so that special precautions to regulate the pressure of the blower air according to the height of the water level are not required.

At least the veterinary medical embodiment of the device is preferably made of stainless steel.

The invention claimed is:

1. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,
   wherein a manually guidable water hose is provided which can be supplied with rinsing water from the cleaning water located in the device via a dirt filter and a feed pump which can be switched on and off.

2. The device according to claim 1, wherein the air supply system comprises channels running in a horizontal plane with air outlet openings opening to both sides.

3. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,
   wherein a heating device for heating the conveyed air is incorporated after the blower.

4. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,
   wherein connected to the blower is a second branch of the air supply system which can be switched on and off separately, which has obliquely downwardly directed second air outlet openings arranged in the upper region of the inside of the side wall of the basin, wherein the section of the second branch of the air supply system having the second air outlet openings is arranged such that it is adjustable in height.

5. The device according to claim 4, wherein the second branch has a manually guidable air hose which can be acted upon with air as desired.

6. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,
   wherein a metering device to deliver an additive into the air flow is connected to the first branch of the air supply system.

7. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,     wherein the intermediate bottom is assigned a lifting device which is suitable for lifting the intermediate bottom from its base position associated with a cleaning phase into a position associated with a drying phase and keeping it there for a while.

8. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,     additionally comprising a level sensor constructed and arranged for emitting a first signal when an adjustable maximum filling height is reached in the basin and emitting a second signal after leaving this maximum filling height as soon as the emptied state of the basin is reached, wherein for signal transmission the level sensor is connected to a control circuit which is suitable for controlling at least the blower, and optionally the heating, the duration of the cleaning and drying phase and the function of the feed pump for filling or emptying the basin according to signals obtained from the level sensor and from an adjustable time switch member.

9. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,     wherein the first branch of the air supply system is connected to the intermediate bottom at a distance from its underside.

10. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,     wherein lifting elements for the intermediate floor which are movable synchronously vertically up and down by a central drive device are arranged in the substantially rectangular basin in plan view, in the four corners.

11. A device for cleaning dogs comprising a basin having a bottom and a side wall extending upwards from this bottom and comprising a perforated intermediate bottom arranged inside the space enclosed by the basin at a vertical distance from the basin edge, wherein underneath the intermediate bottom there is arranged a first branch of an air supply system connected to a controllable blower which is provided with air outlet openings distributed uniformly over the base surface, which are directed laterally and/or downwards,     wherein the intermediate bottom with the part of the air supply system having the air outlet openings associated therewith and optionally with a lifting device used for its vertical motion is arranged as a removable unit in the basin.

\* \* \* \* \*